(12) United States Patent
Garcia De La Pena Razquin

(10) Patent No.: US 11,486,361 B2
(45) Date of Patent: Nov. 1, 2022

(54) CLOSED STRAP COLLAR FOR SECURING CARGO BY MEANS OF FRICTION, DEVICE FOR LIFTING CARGO AND LIFTING METHOD

(71) Applicant: LEUNAMME TECHNOLOGY, S.L., Mutilva (ES)

(72) Inventor: Emmanuel Garcia De La Pena Razquin, Mutilva (ES)

(73) Assignee: LEUNAMME TECHNOLOGY, S.L., Mutilva (ES)

( * ) Notice: Subject to any disclaimer, the term of this patent is extended or adjusted under 35 U.S.C. 154(b) by 382 days.

(21) Appl. No.: 16/758,922

(22) PCT Filed: Oct. 29, 2018

(86) PCT No.: PCT/ES2018/070699
§ 371 (c)(1),
(2) Date: Apr. 24, 2020

(87) PCT Pub. No.: WO2019/086738
PCT Pub. Date: May 9, 2019

(65) Prior Publication Data
US 2020/0256318 A1    Aug. 13, 2020

(30) Foreign Application Priority Data
Oct. 31, 2017  (ES) .................................. P201700762

(51) Int. Cl.
| *F03D 13/10* | (2016.01) |
| *B66C 1/10* | (2006.01) |
| *B66C 1/24* | (2006.01) |
| *B66C 1/44* | (2006.01) |
| *B66C 23/20* | (2006.01) |
| *B66C 23/24* | (2006.01) |
| *B66C 1/18* | (2006.01) |

(52) U.S. Cl.
CPC .............. *F03D 13/10* (2016.05); *B66C 1/108* (2013.01); *B66C 1/18* (2013.01); *B66C 1/445* (2013.01); *B66C 23/207* (2013.01); *B66C 23/24* (2013.01)

(58) Field of Classification Search
CPC ......... F03D 13/10; B66C 1/108; B66C 23/24; B66C 23/207; B66C 1/445; B65G 7/10
USPC ....................................................... 294/119.2
See application file for complete search history.

(56) References Cited

U.S. PATENT DOCUMENTS 3,050,326 A * 8/1962 Sigvald ..................... B65G 7/12
                                                       81/3.43
3,970,342 A    7/1976 Cotton
(Continued)

FOREIGN PATENT DOCUMENTS

| EP | 2412659 A1 | 2/2012 |
| ES | 2235599 A1 | 7/2005 |

OTHER PUBLICATIONS

International Search Report for International Application No. PCT/ES2018/070699 (3 Pages) (dated Jun. 21, 2019).

*Primary Examiner* — Paul T Chin
(74) *Attorney, Agent, or Firm* — Lucas & Mercanti, LLP

(57) ABSTRACT

A closed strap collar for securing cargo by friction, a device for lifting cargo and a lifting method, the collar being formed by a strap and a tensioner which, by tightening the strap around an element, allows cargo to be secured to the element being held or the held element to be raised by pulling the strap collar.

12 Claims, 9 Drawing Sheets

(56) References Cited

U.S. PATENT DOCUMENTS

| | | | | |
|---|---|---|---|---|
| 5,562,386 | A * | 10/1996 | Browning | B65F 3/04 |
| | | | | 414/408 |
| 5,846,044 | A * | 12/1998 | Smith | B65F 3/048 |
| | | | | 414/408 |
| 7,396,058 | B2 * | 7/2008 | Mariani | B66C 1/10 |
| | | | | 294/119.2 |
| 8,550,522 | B2 * | 10/2013 | Echarri Latasa | B66C 1/62 |
| | | | | 29/889 |
| 10,125,005 | B2 * | 11/2018 | Cohen | B66F 9/087 |
| 10,221,012 | B2 * | 3/2019 | Hund, Jr. | B65F 3/04 |
| 2015/0232304 | A1 | 8/2015 | Monux Belloso | |
| 2021/0270242 | A1 * | 9/2021 | Garcia De La Pena Razquin | B66C 23/207 |

* cited by examiner

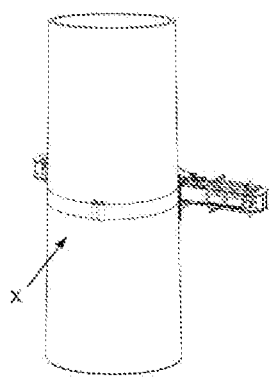
Fig. 1-A
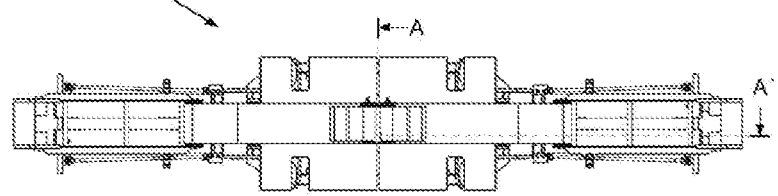
View from "X"
Fig. 1-B
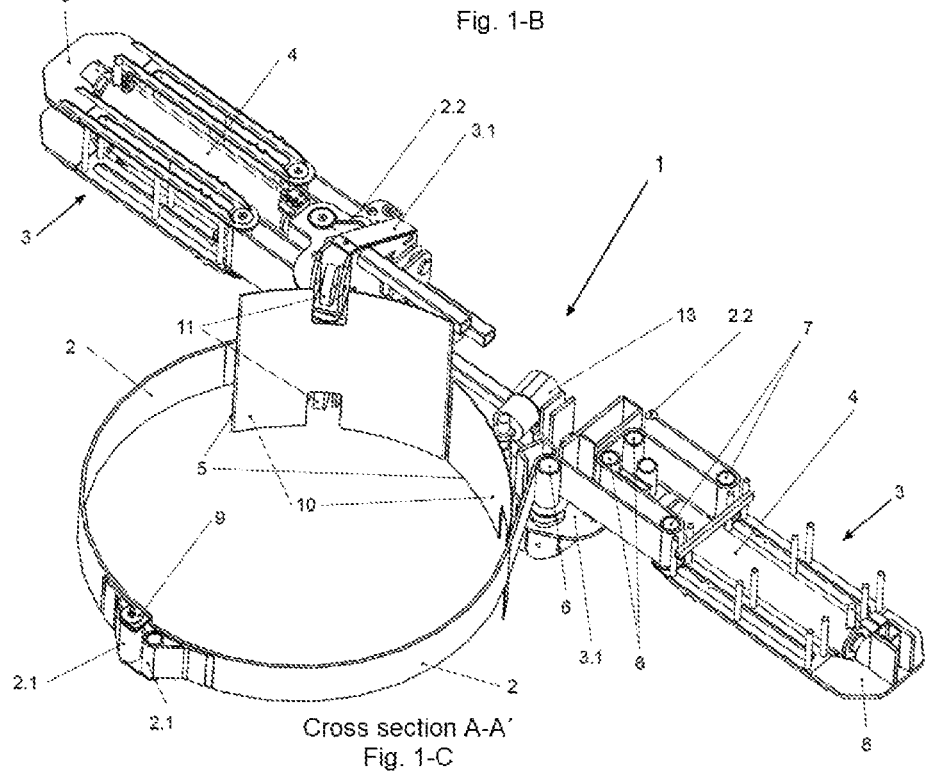
Cross section A-A'
Fig. 1-C

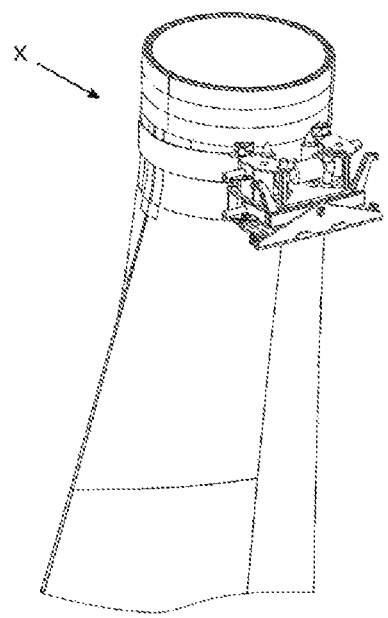
Fig. 2-A
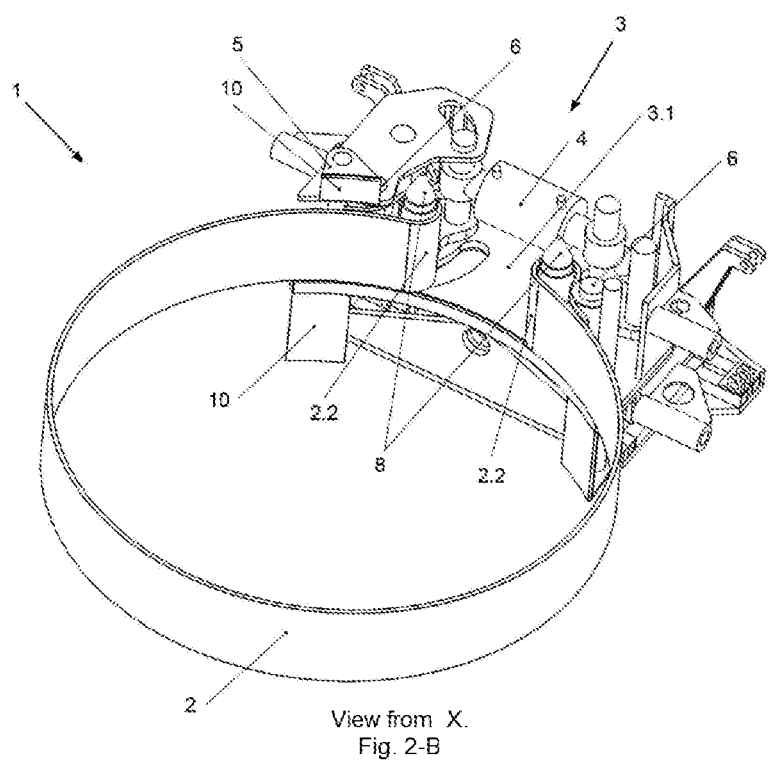
View from X.
Fig. 2-B

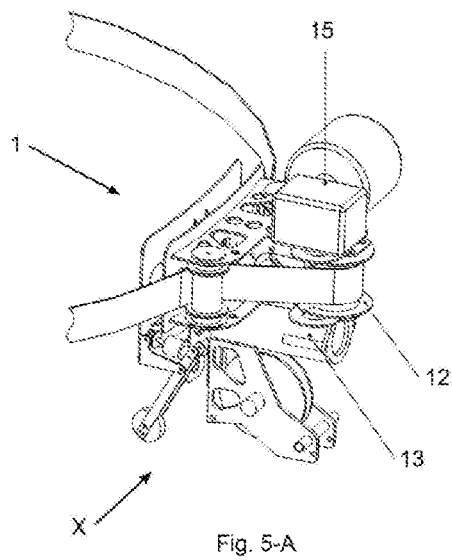
Fig. 5-A
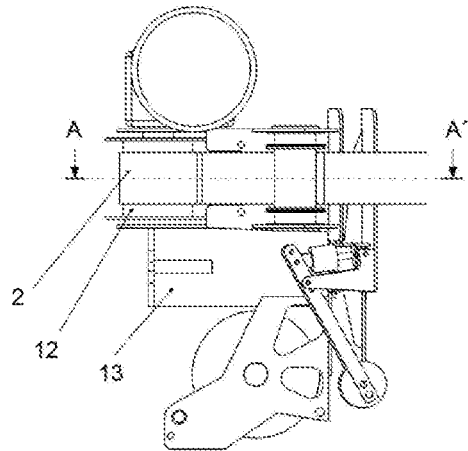
View from X.
Fig. 5-B
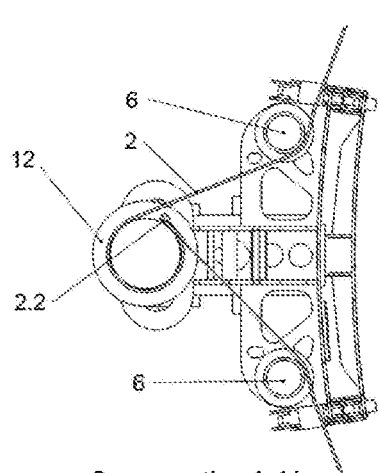
Cross section A-A'
Fig. 5-C

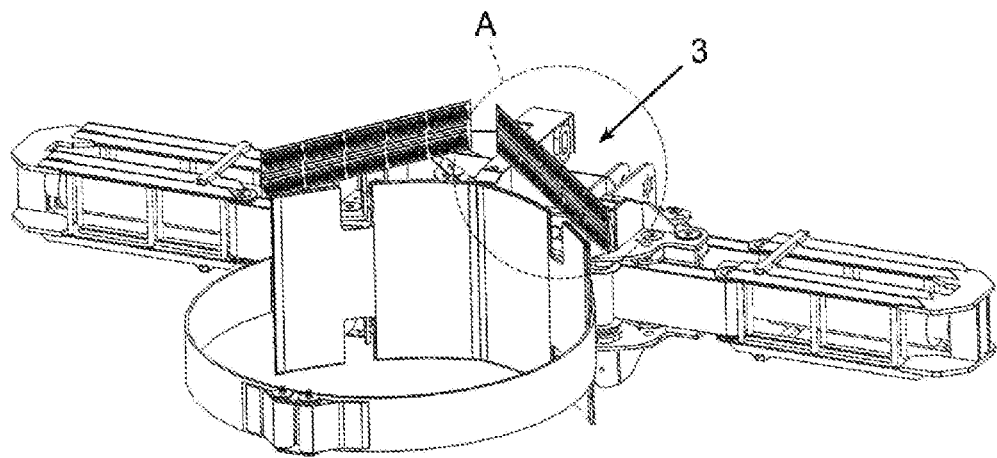
Fig. 6-A
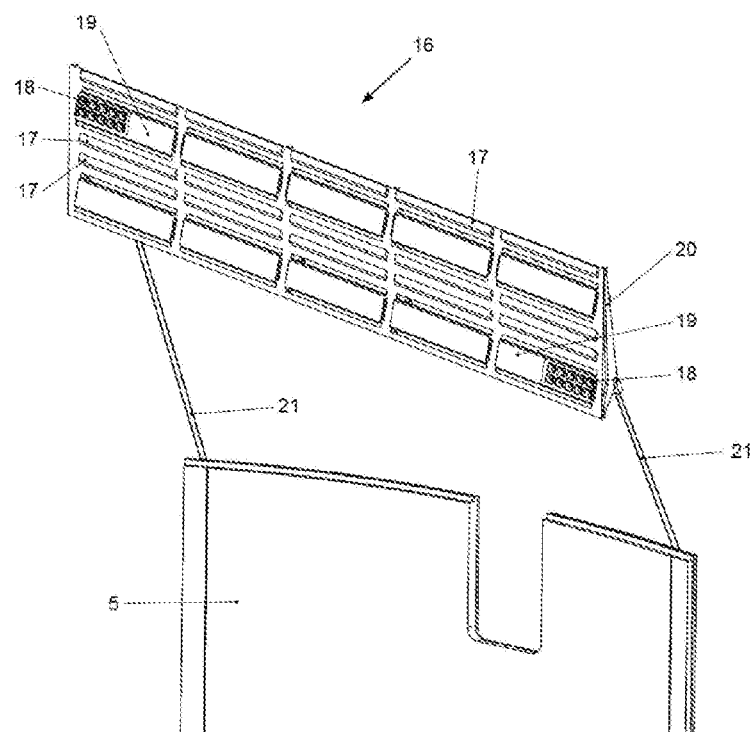
Detail - A
Fig. 6-B

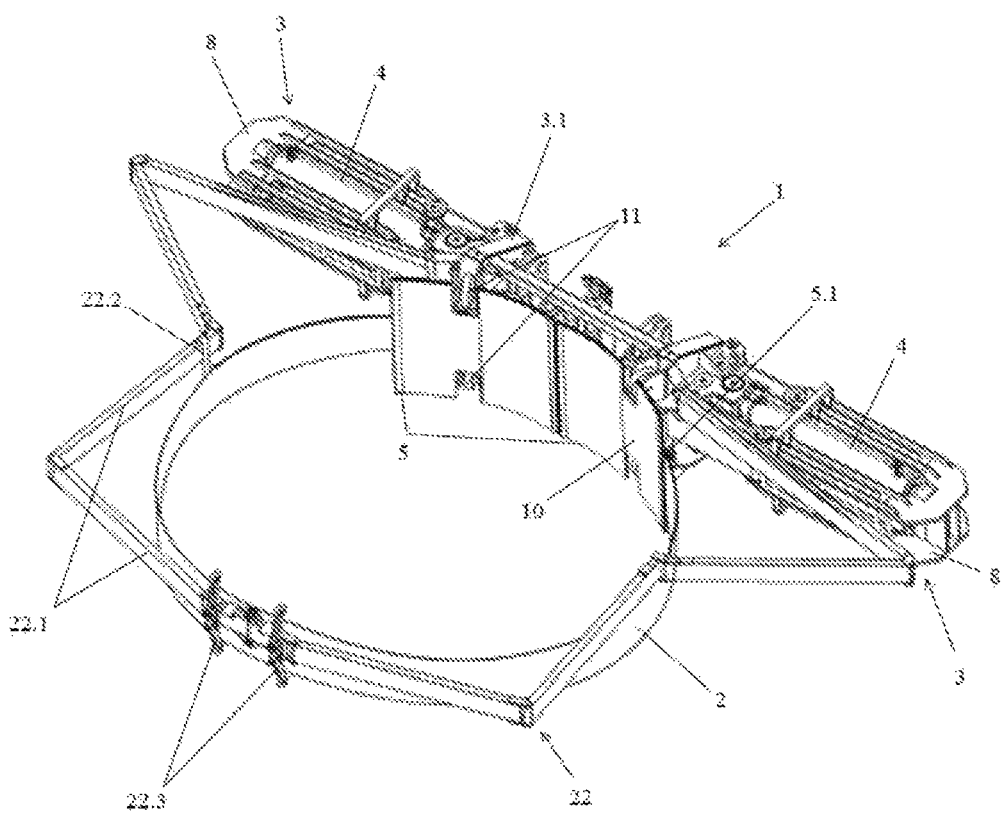
Fig 7-A

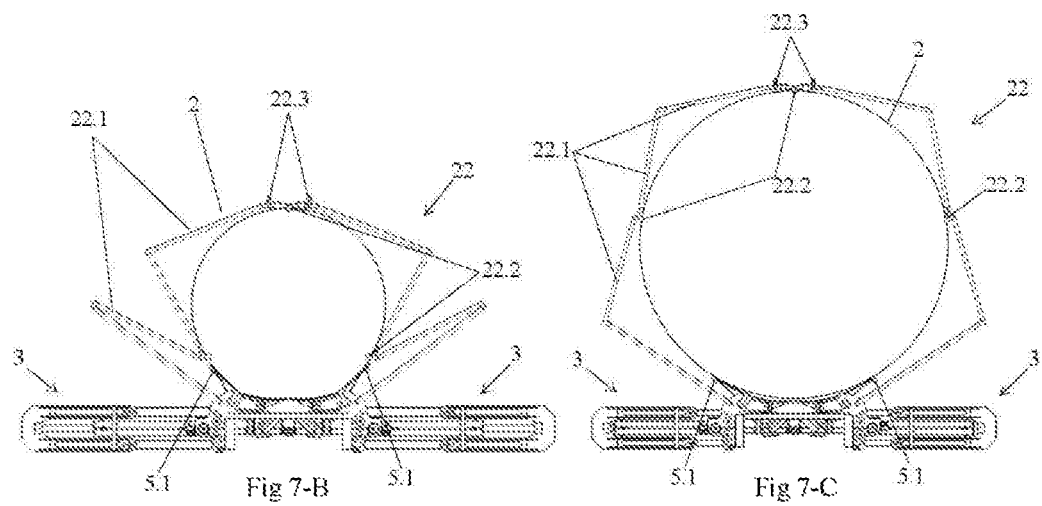
Fig 7-B  Fig 7-C
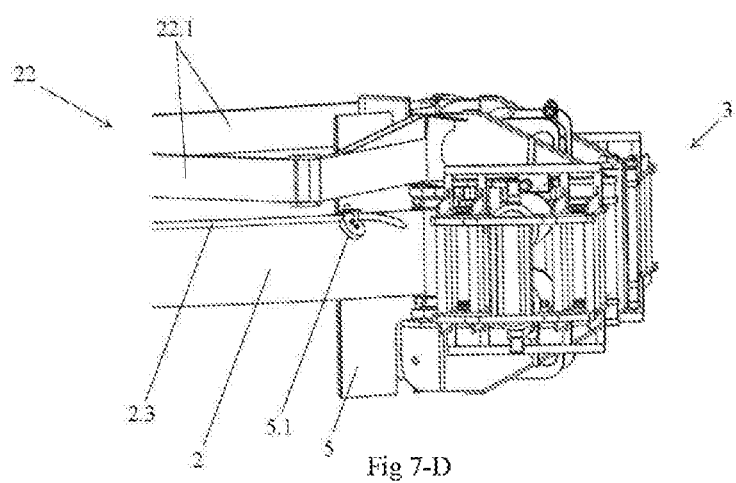
Fig 7-D

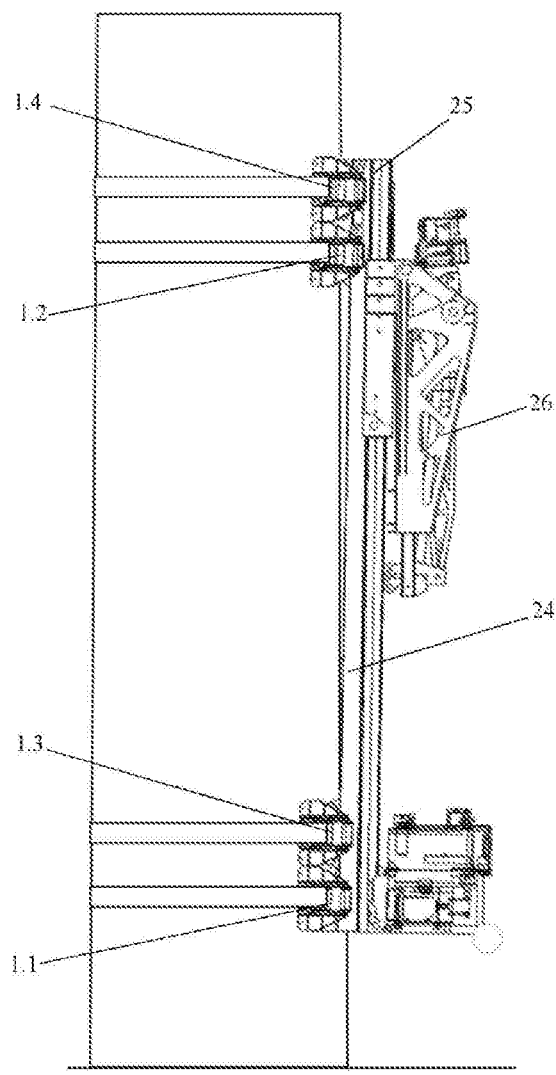
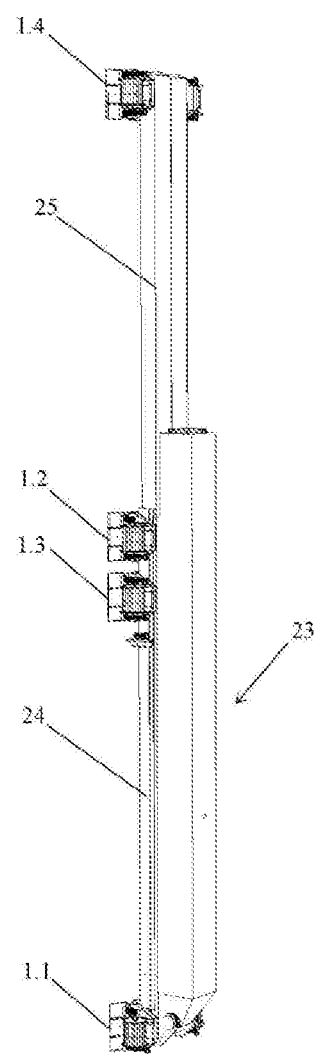
Fig. 8
Fig. 9

CLOSED STRAP COLLAR FOR SECURING CARGO BY MEANS OF FRICTION, DEVICE FOR LIFTING CARGO AND LIFTING METHOD

CROSS REFERENCE TO RELATED APPLICATION

This Application is a 371 of PCT/ES2018/070699, filed on Oct. 29, 2018, which, in turn, claimed the priority of Spanish Patent Application No. P201700762, filed Oct. 31, 2017, each of which are incorporated herein by reference.

TECHNICAL FIELD

The invention relates to a closed collar being formed by a strap and a tensioner which, by tightening thereof, allows cargo to be secured to the element being held or the held element to be raised by pulling the strap collar. A non-limiting example of the first application would be the use of the strap collar to hold a conical or cylindrical tower such as those of wind turbines to be able to climb with tooling. A non-limiting example of the second application would be to use the strap collar to hold the root of a wind turbine blade in order to create a lifting or securing point for the wind blade. Therefore the direct field of application is the wind industry without limitation of the application thereof for construction or any other industry. The invention also relates to a device for lifting blades to the mounting position thereof in a wind turbine and the blade lifting method.

STATE OF THE ART

The use of straps for lifting cargo is well known through the use of slings. With the slings it is possible to partially or totally surround the element to be lifted, but lifting is always carried out by means of a hook that is inserted into the end knots of the sling attached above the element to be lifted. Even when the element that is held with one or more loops is completely surrounded, it is always done with said cylindrical element in a horizontal position and the strap is tensioned as a consequence of the very weight of the element to be lifted. Examples of the use of these slings can be seen in patents EP0508889, EP0532422, and FR2678918.

It is not known in the state of the art the existence of a closed collar formed by one or more straps that are tensioned by means of a tensioner such that the friction generated by said collar allows said collar to be firmly secured to the element to be lifted, enabling the lifting thereof even in a vertical position, or that when clamping the collar on a fixed element, even when this element is vertically fixed, said collar serves as a support point to lift cargo.

OBJECT OF THE INVENTION

The invention consists of a closed collar formed by one or more open straps whose ends are joined in a tensioner or in a tensioner and a buckle.

Said tensioner contains a fixed structure, a support blade/s, actuators and mobile heads.

Said mobile heads are attached to actuators, such as a hydraulic or pneumatic cylinder, an electric motor spindle, a ratchet drum, etc. . . . , whose size and strength will be designed depending on the strength with which the strap is to be tensioned.

Said tensioner in turn incorporates a fixed structure to which one end of the actuator and the ends of the strap are fastened. The other end of the actuator is joined to the aforementioned mobile heads, so that when the actuator expands, the mobile head moves and with it, the strap that has been stretched by mobile redirection pulleys belonging to the mobile head is tensioned.

Said tensioner further incorporates blades to the fixed structure thereof that rest against the element that is held by the collar.

The aforementioned blades react against the element to be held due to the tension that the strap receives when the actuator moves the mobile heads in the direction in which the strap is pulled.

Depending on the pressure to be obtained in the blades, said blades can have motion and be connected to an additional support blade actuator. The friction generated by the blades and the strap against the held element is what enables the strap collar to be firmly secured to the held element and as a consequence to be able to lift it or use it as a support point depending on the function sought in each application.

To ensure a good friction coefficient, the invention contemplates the incorporation of a cleaning brush made up of rows of rubber and rows of textile material, such as polyester fabric, that enable the surface to be cleaned where the blades will subsequently rest. In the event that the element to be held is made of steel, said brushes may incorporate magnets to ensure contact of the brush against the external surface of the element to be held.

In the event that the strap collar is used as a support point for the climbing of tooling to the top of a conical tower, it is necessary to collect the length of the strap. In this case, the invention contemplates different collection alternatives, such as the use of redirections in the strap itself or the use of a drum that collects the strap by means of the action of an electric worm gear motor, for example, which allows a greater collection of the length of the strap before it is clamped with a movement of the main actuator or of the smaller support blade actuator.

The strap collar further comprises a hinged arch to hold the strap in a loosened position when the strap collar moves whilst loosened along the held element. The hinged arch comprises an assembly of sections articulated with each other that are joined to the fixed structure and joining points of the structure with the strap.

Another object of the present invention is a lifting device for lifting cargo that uses strap collars such as the one defined above. Said lifting device comprises a climbing module with two sections associated with the possibility of moving with respect to each other for the extension and collection of one of the sections with respect to the other. Each section has a pair of strap collars for securing the lifting device on a wind turbine tower, while a tilting platform for transporting a blade to be mounted on the wind turbine can be moved along the climbing module, such that the device enables said blade to be lifted to the mounting position thereof in alternate displacements of the sections from the bottom of the wind turbine tower.

Another object of the present invention is a lifting method for lifting cargo that uses the lifting device previously defined. The method comprises fastening the lifting device on the wind turbine tower using the strap collars previously defined and incorporating a blade to be mounted on the tilting platform, to lift it to the mounting height by means of a step-by-step movement of the lifting device. Each step of said movement comprises:

tensioning the pair of collars of the lower section and loosening the pair of collars of the upper section, extending the upper section of the frame with respect to the lower section, tensioning the pair of collars of the upper section and loosening the pair of collars of the lower section, collecting the lower section of the frame such that the tilting platform that transports the blade to be mounted is lifted.

DESCRIPTION OF THE FIGURES

In the attached drawings, a possible embodiment is shown as a non-limiting example, being:

FIG. 1-A corresponds to a perspective view of a strap collar designed to generate a support point, coupled to a cylindrical tower, FIG. 1-B corresponds to a view from "X" of FIG. 1-A and FIG. 1-C corresponds to a cross-sectioned perspective view along the A-A' line of FIG. 1-B to be able to better see the internal elements such as the redirections of the strap created to be able to collect a greater strap length.

FIG. 2-A corresponds to a perspective view of a strap collar attached to the root section of a wind blade and FIG. 2-B shows a perspective view from point "X" of FIG. 2-A of a strap collar assembly designed to hold a wind blade by the root thereof.

FIG. 5-A is a perspective view of a strap collar assembly that uses a drum to collect the excess length replacing the redirections, FIG. 5-B shows a view from "X" of FIG. 5-A and the FIG. 5-C shows a cross section A-A' of FIG. 5-B.

FIG. 6-A represents a strap collar assembly to which a pair of cleaning brushes has been incorporated and FIG. 6-B shows the "A" detail of FIG. 6-A corresponding to a perspective view of one of the cleaning brushes.

FIG. 7-A shows a strap collar like the one in FIG. 1-C with an arch structure to prevent the strap from falling when it is loosened. FIGS. 7-B and 7-C show the actuation of the arch structure. FIG. 7-D shows an enlarged detail of the collar of FIG. 7-A.

FIG. 8 shows a view of the lifting device for lifting cargo, in the blade variant thereof, arranged on a wind turbine tower.

FIG. 9 shows a view of the cargo climbing module with the sections thereof in an extended position.

DETAILED DESCRIPTION OF THE INVENTION

Figure 3:
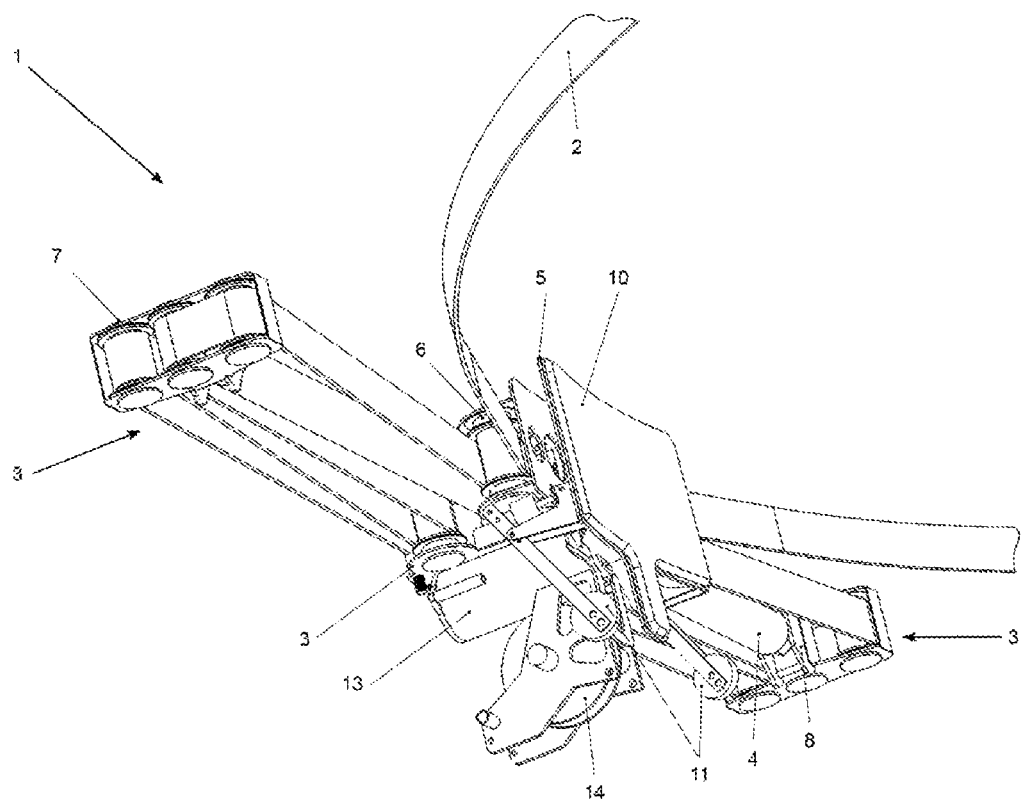
FIG. 3 is a perspective view of a strap collar assembly showing the operation of a mobile support blade with the actuator retracted.

FIG. 1-C shows the strap collar assembly (1) where the following elements are distinguished:

(2) straps
(2.1) strap buckle end
(2.2) strap tensioner end
(3) tensioner assembly including the elements (3.1), (4), (5), (6), (7), (8), (10), (11), (12), (13) and (14).
  (3.1) fixed structure
  (4) actuators
  (5) support blades
  (6) rerouting sheaves
  (7) mobile redirection pulleys
  (8) mobile tensioning heads
  (9) buckle
  (10) blade coating
  (11) wheels
  (12) drum
  (13) support blade actuator
  (14) load pulley
  (15) gearmotor
  (16) brush assembly
  (17) rubbers
  (18) magnets
  (19) fabric
  (20) flexible support
  (21) arms FIG. 1-A shows a strap collar designed to create a support point on a vertical cylindrical or conical structure, such as a wind turbine tower.

To form the collar, the element to be held is surrounded and the ends (2.1) of the two straps are fastened to the buckle (9) and the ends (2.2) of the two straps are fastened to the end shafts of the fixed structure (3).

Then, the actuators (4) that are secured to the fixed structure (3) at one end and that are connected to the mobile tensioning heads (8) at the other end are activated, which by means of the linear movement of the actuator (4) move the mobile redirection pulleys (7) collecting more strap length than the length of the movement of the rod of the actuator (4), in the example of FIG. 1-A, as having 4 redirections, 4 times more would be collected.

Collecting the length of the strap causes the external surface of the element that is being held (such as a wind turbine tower) to move closer to the support blades (5) that include a coating (10) that prevents damages and increases the friction coefficient of the support blade (5) on the surface of the element being held. Said coating (10) can incorporate a patterned surface or be perforated together with the support blade (5) to facilitate the evacuation of liquids when it is pressed against the external surface of the element being held.

Next, the support blade actuators (13), which are attached to the fixed structure (3) at one end and to the support blade (5) at the other, are activated so that when they expand they separate the fixed structure (3.1) with the end shafts where the strap of the element being held has been fastened, thus achieving an increase in the tension of the strap and therefore the reaction of the support blades (5) on the surface of the element being held.

FIGS. 2-A and 2-B show an example of the use of the strap collar according to the second application of the invention, that is, lifting the held element by pulling said strap collar. FIG. 2-A specifically shows a strap collar designed to secure a wind blade at the root thereof.

In this case, the strap collar (2) is placed around the root of the blade and the two ends (2.1) and (2.2) are inserted into the mobile tensioning heads (8) that in this case have a tip to assist the insertion thereof into the two end knots of the strap (2.1) and (2.2).

Once the mobile tensioning heads (8) have been inserted, the linear actuator (4) is then actuated, which moves the mobile head (8) by means of a lever, causing the tensioning of the strap thanks to the re-routing sheaves (6).

This tensioning causes the element to be held to move closer to the support blades (5), which in turn are protected by the coatings (10) that prevent the generation of markings on the surface of the element to be held.

FIG. 3 shows a lighter strap collar, designed to create a support point for smaller cargo. The different elements described in FIG. 1 can be identified therein.

Figure 4:
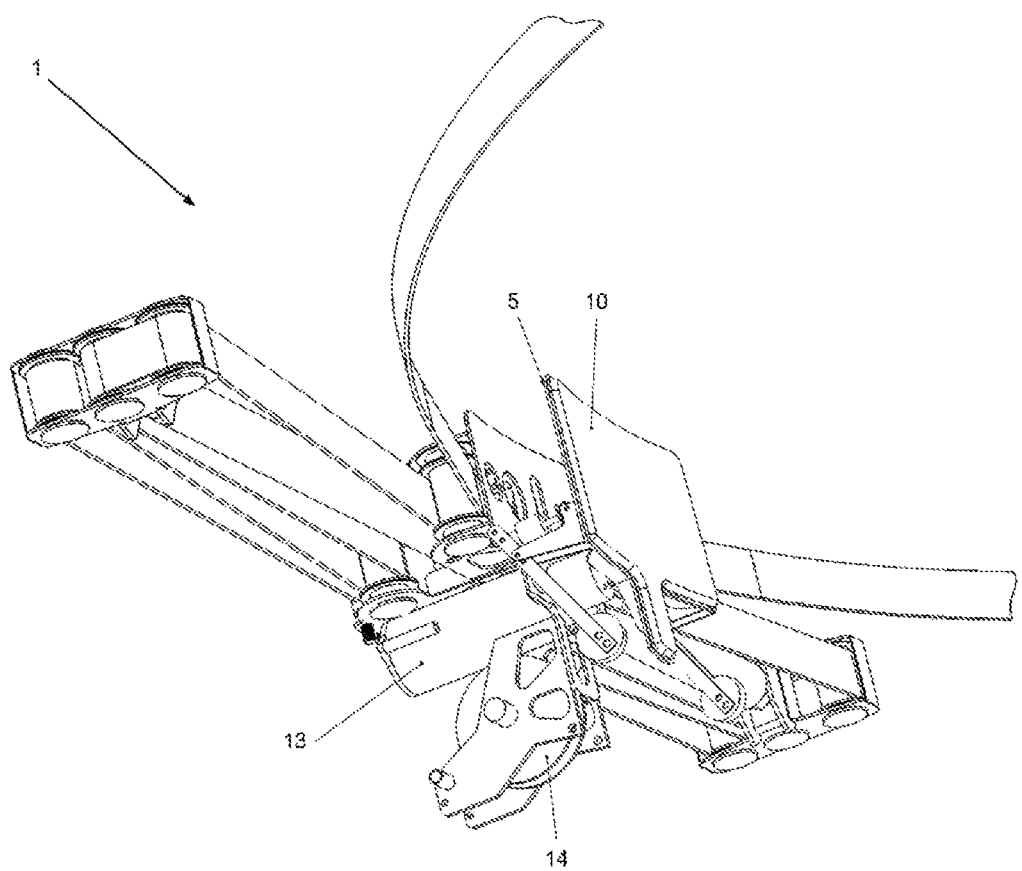
FIG. 4 contains a perspective view of a strap collar assembly showing the operation of a mobile support blade with the actuator expanded.

FIG. 4 shows the same strap collar of FIG. 3 with the support blade actuator (13) extended, showing how it moves the support blade (5) with the coating (10) thereof to increase the tension in the strap and thus achieve a greater reaction in the blade and therefore greater friction force and vertical load capacity in the load pulley (14).

FIG. 5-A shows an embodiment of the strap collar with a perspective view, a view according to "X" (FIG. 5-B) and an A-A' cross section (FIG. 5-C), where the collection of the strap is carried out by means of a drum (12) connected to a rotary actuator, such as, for example, a worm gear reducer actuated by an electric/hydraulic motor (15).

FIG. 6-B shows an embodiment of a cleaning brush (16) that is joined to the tensioning assembly (3) (FIG. 6-A) such as, for example, through hinged arms (21) connected to the support blades (5). The brush (16) comprises a flexible support (16) that adapts to different curvatures and that is at an angle to evacuate dirt, incorporates a series of rows of rubber (17) and a series of rows of fabric (19) that remove possible oil, grease or dirt debris of any kind that may be present on the external surface of the element to be held. The arms can incorporate any system that enables pressure to be applied to the brush (16) on the surface to be cleaned, and in the case of cleaning surfaces that may be attracted by a magnet, the invention envisages in the preferred embodiment thereof the incorporation of magnets (18) that would be covered by the fabric (19) to avoid causing damage to the surface and clean it at the same time.

FIGS. 1-C and 3 show wheels (11) that have been designed to prevent contact between the tensioner (3) and the element to be held and thus ensure that no damage occurs when the collars are moved with the strap (2) loosened. When tensioning of the strap collar occurs, the wheels of FIG. 1-C separate due to the actuation of the support blades (5). The wheels (11) of FIG. 3 incorporate a spring and lever system so that they withdraw when the strap (2) is tensioned even without activating the support blade actuator (13).

The tensioner (3) incorporates a control system based on movement sensors and pressure sensors connected to an electronic control unit that ensure that the movements of the actuators (4) and (13) are those necessary to achieve the desired tension in the strap and the reaction sought in the support blades at all times.

An embodiment of the strap collar is shown in FIG. 7A, as shown in FIG. 1-C but that additionally has an arch structure (22) to keep the strap (2) in a loosened position, thus preventing the strap (2) from falling, rubbing or catching the held element or other elements when the collar moves with the loosened strap (2) along the held element.

The arch structure (22) comprises an assembly of sections (22.1) and joining points (22.2) of the structure (22) with the strap (2). The assembly of sections (22.1) is joined at the ends thereof with the fixed structure (3.1), and the sections (22.1) are articulated with each other to be able to expand and contract accompanying the strap (2) but keeping it in a horizontal position when it is loosened, preventing it from falling, as shown in FIGS. 7-B and 7-C.

Additionally, the arch structure (22) further comprises a closing section with wheels with springs (22.3) to pull the strap (2) when it is loosened and thus ensure that the excess length of strap (2) moves to the opposite side to where the device is located, making it easier for the strap (2) to slide along the tower.

The strap collar of the embodiment of FIG. 7A further comprises sheaves (5.1) that run through a projection (2.3) that the strap (2) incorporates to assist guiding. In the detail of FIG. 7D it is observed how said sheaves (5.1) are fastened to the support blades (5).

It is envisaged to use the same tensioner (3) that tensions the strap (2) to actuate the arch structure (22), such that both the tensioning and the loosening of the strap (2) and the accompaniment of the arch structure (22) are carried out in a synchronised way. It is also possible to use an independent actuator.

FIGS. 8 and 9 show a lifting device for lifting cargo and specifically for lifting wind turbine blades. The device is made up of a climbing module (23) with a lower section (24) and an upper section (25), the upper section (25) being movable with respect to the lower section (24), such that the sections (24,25) have a telescopic arrangement.

Each section (24,25) of the climbing module (23) has a pair of strap collars (1), such as those represented in FIGS. 1, 3, 4, 5, 6 and 7, with a strap collar (1) being arranged at each end of the sections (24,25).

As observed in detail in FIGS. 8 and 9, the strap collars (1.1,1.2) of the lower section (24) are interspersed with the strap collars (1.3,1.4) of the upper section (25), that is, the strap collar (1.2) that is arranged on the upper end of the lower section (24) is above the strap collar (1.3) that is arranged on the lower end of the upper section (25).

In this way, the two collars (1.3, 1.4) of the upper section (25) are movable with respect to the two collars (1.1, 1.2) of the lower section (24) when the upper section (25) extends, leaving the collar (1.3) in a position always lower than the collar (1.2), thus allowing the extension and collection of the sections (24,25) and thus ensuring greater stability of the lifting device, as it always has a tensioned collar interspersed between sections (24,25) at any time in the climbing sequence that will be described below.

The climbing module (23) has a tilting platform (26) on which the blade to be mounted on the wind turbine is arranged. The tilting platform (26) is movable along the climbing module (23), while it can tilt between a position in which the blade is arranged perpendicularly to the climbing module (23) and a position in which the blade remains parallel to the climbing module (23). This tilting arrangement of the platform (26) enables the blade to be arranged in a position parallel to the wind turbine tower when the lifting device is in an elevated position in the climbing sequence, and the blade to be arranged in a position perpendicular to the tower when the device is in a low position close to the ground, wherein the parallel arrangement of the blade is not possible since, given the length thereof, it would collide with the ground.

Accordingly, to carry out the assembly of a blade in the wind turbine, the blade is transported in a truck or similar to the base of the wind turbine tower and the lifting device is attached with the strap collars (1) at the lower end of the tower, with the upper section (25) retracted into the lower section (24), for example, as shown in FIG. 8.

The attachment of the blade to the tilting platform (26) can be carried out using a strap collar (1) such as the one represented in FIGS. 2A and 2B.

Then the tilting platform (26) descends in a position perpendicular to the wind turbine tower to the lower end of the climbing module (23) in order to mount the blade on the platform (26), and then the platform (26) ascends along the climbing module (23) to the upper end thereof, but maintaining a perpendicular position to the tower since the proximity of the device to the ground does not enable the blade to be arranged parallel to the tower.

This is the arrangement in which begins the climbing of the device to raise the blade step by step from the bottom of the wind turbine to the top wherein it is mounted on the hub of the wind turbine.

For this, having the device attached to the tower with the strap collars (1) tensioned, the pair of collars (1) of the upper section (25) is loosened, such that the upper section (25) is released so that it can be extended with respect to the lower section (24). When the upper section (25) is in the most extended position thereof, the pair of collars (1) of the upper section (25) is tensioned to fasten it to the tower, and then the pair of collars (1) of the lower section (24) is loosened, such that the lower section (24) is released so that it can be collected, thus lifting the tilting platform (26) transporting the blade.

Then the process is repeated, first tensioning the pair of collars (1) of the lower section (24) and then loosening the pair of collars (1) of the upper section (25), extending the upper section (25), tensioning the pair of collars (1) of the upper section (25) again and then loosening the pair of collars (1) of the lower section (24), and collecting the lower section (24) to lift the blade a new step again.

During the climbing process, when the lifting device separates far enough from the ground for the blade to be arranged in a position parallel to the tower without colliding with the ground, the platform (26) is tilted to arrange the blade parallel to the tower, so that the effort required to lift the blade is reduced.

When the lifting device reaches the top of the wind turbine, the blade is detached from the tilting platform, for which the strap collar securing the blade is loosened, and the blade is mounted on the hub of the wind turbine.

It is evident that the method for lowering the blade from the top to the bottom of the wind turbine is similar to that described above, but in reverse direction.

"In the sense of the present invention, support blades (5) are understood to be pads which are elements that work by friction."

The invention claimed is:

1. A strap collar for securing cargo by means of friction wherein they are closed comprising one or more open straps whose ends are joined in a tensioner; said tensioner containing mobile heads or drums that by means of the movement thereof tension and loosen the strap or straps; said mobile heads or drums are joined to a linear or rotary actuator or actuators respectively; said tensioner in turn incorporates a fixed structure on which the actuators react to move the mobile heads or rotate the mentioned drums, said fixed structure further incorporates shafts to which are joined the ends of the strap or straps and one or several blade(s) with a coating that rests/rest and reacts/react against the element to be held with the strap collar; said tensioner incorporates a sensor control system and a processing unit that feeds back to the actuators and to ensure the desired tension in the strap and the adequate pressure in the support blades.

2. The strap collar according to claim 1, wherein the blade or blades are mobile and incorporate an actuator or support blade/s actuators that is joined to the fixed structure and to the support blade/s so that when actuated it can increase or decrease the reaction of the support blade/s against the element to be held.

3. The strap collar according to claim 1, wherein the mobile heads of the linear actuators incorporate mobile redirection pulleys and the fixed structure incorporates rerouting sheaves that enable the redirection of the strap to collect a greater length of strap than the length of the path of the linear actuator.

4. The strap collar according to claim 1, wherein the straps are joined to close the collar with the help of a buckle at an end thereof.

5. The strap collar according to claim 1, wherein the tensioner incorporates wheels to prevent contact of the tensioner and the components thereof with the external surface of the held element when the strap is loosened in order to move the closed strap collar along the held element.

6. The strap collar according to claim 1, wherein it incorporates a cleaning brush.

7. The strap collar according to claim 1, further comprising a hinged arch to keep the strap in a loosened position when the strap collar moves whilst loosened along the held element.

8. The strap collar according to claim 7, wherein the hinged arch comprises a set of sections articulated with each other that is joined to the fixed structure and to joining points of the structure with the strap.

9. The strap collar according to claim 7, wherein the arch structure further comprises a closing section with wheels with springs.

10. The strap collar according to claim 7, further comprising sheaves running through a projection that the strap incorporates.

11. A device for lifting cargo using strap collars as defined in claim 1, comprising a climbing module having a lower section and an upper section that are associated with the possibility of movement with respect to each other for extension and collection of the lower section with respect to the upper section, wherein each section has a pair of strap collars for securing the lifting device on a wind turbine tower, while a tilting platform is movable along the climbing module for transporting a blade to be mounted on the wind turbine, such that the device enables the blade to be lifted to the mounting position thereof, in alternate movement of the sections from the bottom of the wind turbine tower.

12. A lifting method for lifting cargo that uses the lifting device according to claim 11, comprising attaching the lifting device on the wind turbine tower using the strap collars and the incorporation on the tilting platform of the blade to be mounted to lift it to the mounting height by means of a step-by-step movement of the lifting device, wherein each step of said movement comprises:
  tensioning the pair of strap collars of the lower section and loosening the pair of collars of the upper section,
  extending the upper section of the climbing module with respect to the lower section,
  tensioning the pair of collars of the upper section and loosening the pair of collars of the lower section, and
  collecting the lower section of the climbing module such that the tilting platform that transports the blade to be mounted is lifted.

* * * * *